Patented Aug. 13, 1929.

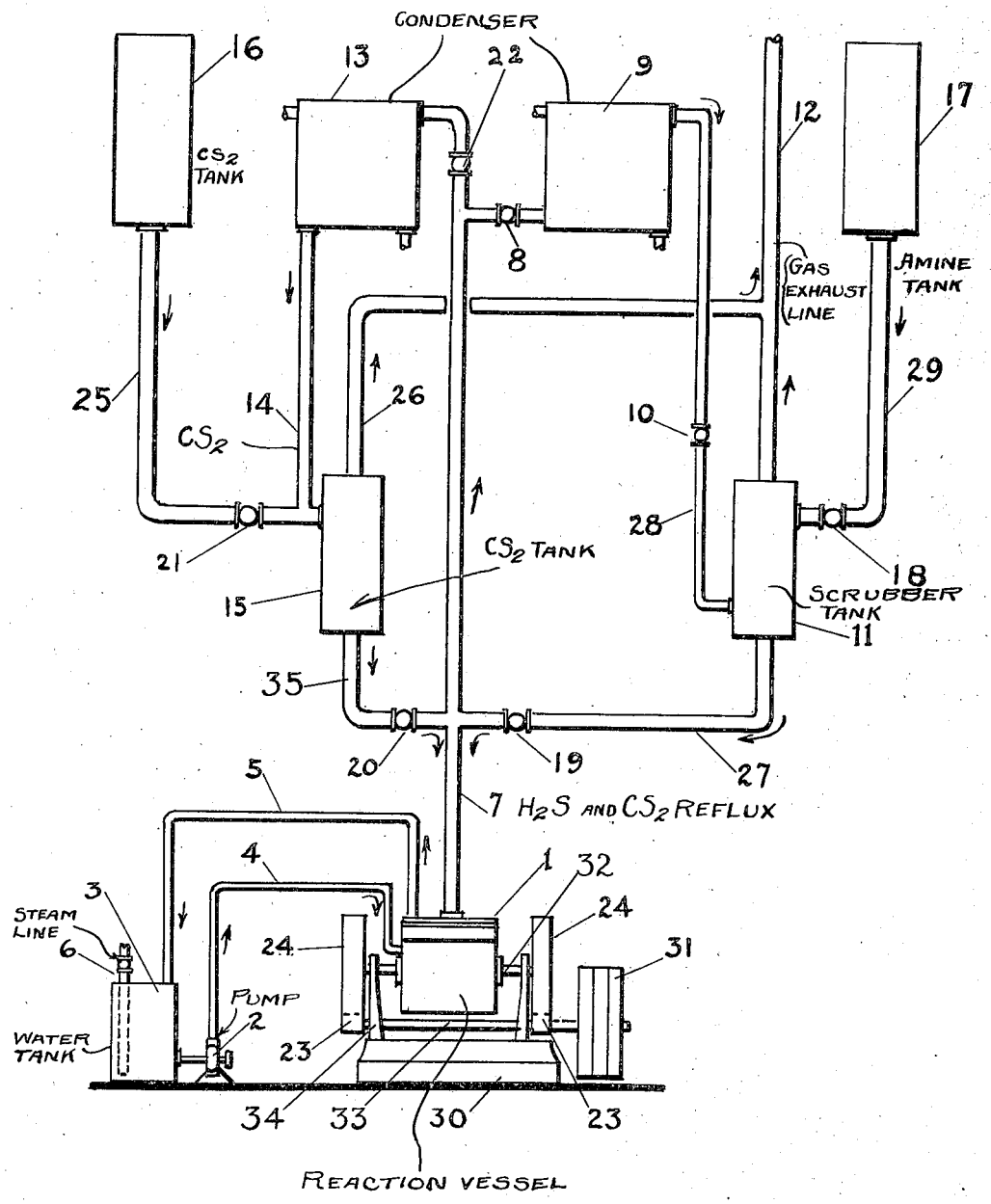

1,724,580

UNITED STATES PATENT OFFICE.

CARL NELSON HAND AND CLARENCE E. SMITH, OF NITRO, WEST VIRGINIA, ASSIGNORS TO THE RUBBER SERVICE LABORATORIES CO., OF AKRON, OHIO, A CORPORATION OF OHIO.

PROCESS OF MANUFACTURING THIOUREAS.

Application filed October 1, 1924. Serial No. 740,940.

The object of our present invention is to provide a method of preparing thio-ureas by an improved process in which the interaction of the materials is carried out at comparatively low temperatures for this type of reaction. Furthermore, the use of an excess of the high boiling constituents in this reaction is avoided, whereby a high yield of a product, uncontaminated by side-reaction products is realized. Particularly our invention is directed to a process of preparing symmetrical di-phenyl-thio-urea, that is thio-carbanilide, and similarly constituted compounds, under such controlled temperature conditions that during the reaction period the temperature of the mass is maintained only slightly above, and approximately at, the boiling point of the lowest boiling ingredient present.

Heretofore, the commonly used process of preparing thio-carbanilide, and like compounds, has comprised the reaction of an aromatic primary amine, such as aniline, with a great excess of carbon bisulfid, customarily in the presence of sulfur, and usually with no attempt at temperature control. A relatively poor yield of an impure product is obtained by this process. Attempts to prepare thio-ureas in commercial quantities by the use of a solvent have not been successful because of the comparatively slight solubility of the thio-ureas in the common organic solvents. The use of an excess of an amine in the preparation of thio-ureas is likewise impracticable, as this would require a difficult and costly purification of the product.

Our improved process is fully described and will be readily understood by reference to the following description and accompanying drawing, which is a diagrammatic representation partly in section of one arrangement of the apparatus necessary for carrying out the process in its preferred form. The important feature of our process is the provision of a means and a method whereby the gaseous products of the reaction are substantially instantaneously removed from the reaction zone as formed, in order that the reaction can be made to proceed to completion and that a product may be obtained which will not require further purification.

The requisite quantity of an aromatic primary amine, such as aniline, is drawn from storage tank 17 through line 29, controlled by valve 18 into tank 11, and thence through line 27, controlled by valve 19, and through line 7 into mixer 1. The mixer is capable of being tightly closed, and is jacketed so that temperature controlling or heating or cooling means, such as water, may be circulated from tank 3 by means of a circulating pump 2, thru line 4 into and through the jacket of the mixer 1, and thence by line 5 back to tank 3. In case it is desirable to warm the temperature controlling means, steam may be admitted through line 6 to the water contained in tank 3. The contents of the mixer 1 are agitated by means of paddles, or other stirring devices (not shown) connected within the mixer to a shaft 32, turned by a gear wheel 24, operated by gears 23, mounted on a shaft 33, which shaft is revolved by a pulley 31, operated by any desired means. The shaft 32 is supported by upright bearings 34, mounted on a suitable setting 30.

A quantity of aniline approximately equal to the amount run into mixer 1 is also withdrawn from storage tank 17, and flowed through line 29 into tank 11 and (valve 19 and valve 18 being closed), is retained there to serve as a scrubber for vapors evolved, as is more fully described hereinafter.

Carbon disulfid, in quantity equal to approximately 60% by weight of the aniline, or other aromatic primary amine taken, is withdrawn from storage tank 16, and run through line 25, controlled by valve 21 into tank 15, and thence through line 35, controlled by valve 20, into line 7, and into mixer 1. The mixer is then closed tightly, and the stirring mechanism set in motion. Water, heated to a temperature of 46.2° C. and carefully maintained at that temperature, is circulated thru the jacket of mixer 1 from tank 3 by pump 2 at a rate sufficient to maintain the contents of the tank at the temperature desired. Valves 20, 21, 22, 18 and 19 are closed, while valves 8 and 10 are open during the reaction.

The reaction between aniline and carbon disulfid starts immediately, and carbon disulfid vapors, conducting away the hydrogen sulfid, rises thru line 7 into a water cooled condenser 9. The carbon disulfid passing from the reaction chamber is more or less completely condensed, and most of it returns through line 7 to the mixer 1, while the remainder, with the gaeous hydrogen sulfid, passes thru line 28 into tank 11, which, as was mentioned before, contains a second charge of aniline for the mixer. The aniline scrubs out and absorbs the carbon disulfid, while the hydrogen sulfid passes out of and away from the apparatus thru the vent pipe 12. The reaction taking place in the mixer continues until all the aniline or other amine has been combined with the carbon disulfid, and, as the reaction is a comparatively slow one, the time required for the complete change to be effected is ordinarily a matter of several hours.

When the reaction is completed, and no free amine remains in the mixer, a condition which may be in part recognized by a great diminution or nearly complete cessation in the flow of hydrogen sulfid from the vent pipe, valve 8 in the pipe leading to the condenser 9 is closed, and valve 22, in pipe 7, leading to condenser 13, is opened. The temperature of the water circulating thru the jacket of mixer 1 is now increased to approximately 75° centigrade and all excess and residual carbon disulfid is thereby distilled off. The vapors of carbon disulfid pass thru pipe 7 into a water-cooled condenser 13, and thence the liquid flows thru pipe 14 into receiving tank 15. Vapors of hydrogen sulfid pass through the condenser 13, pipe 14, receiving tank 15, and thence thru line 26, and vent pipe 12 into the air. After the carbon disulfid has been completely removed from the mass in the mixer, cold water is passed through the jacket of the mixer until the product is cool. The mixer is then opened, and the product removed therefrom. The thiocarbanilide so formed is obtained in a pure state, uncontaminated by excess of reagents, or side reaction products, and requires no subsequent purification.

The reaction taking place between an aromatic primary amine, and carbon disulfid to produce thiourea, is of course, well known. Heretofore, the reaction has been carried out either under high temperature conditions, whereby a great excess of carbon disulfid was required, or in a closed chamber from which there were no provisions for allowing the gaseous products to escape during the reaction. This resulted in a gradual slowing down of the speed of the reaction which soon reached the equilibrium point, beyond which the reaction could not go. At this point there is always a considerable amount of the amine left uncombined with the disulfid. In our preferred process, the temperature is carefully controlled to permit, so far as possible, the formation of a minimum quantity of vapors, but since the vapors and gaseous products are removed from the reaction zone as soon as they are formed, an equilibrium point is never reached, and consequently the reaction is forced to proceed to completion. Our invention, then, comprises the imposition of such operative conditions that the equilibrium of the reaction is disturbed sufficiently to allow the chemical change to proceed to completion, whereby a product is obtained in which all of the amine taken is utilized in the reaction, while only a comparatively slight excess of the carbon disulfid is needed. This, as we have pointed out hereinbefore, is accomplished by carrying out the reaction at a temperature approximately equal to, and only slightly above the boiling point of the carbon disulfid.

An important feature of the invention is the rapid and complete removal of the hydrogen sulfid from the reaction zone. This is accomplished, as is apparent to those skilled in the art, by the return from the condenser to the reaction zone of the liquid carbon disulfid which quickly becomes heated and vaporized, and picks up the hydrogen sulfid as fast as it is formed in the reaction, and conducts it away from the chamber. This prevents the mass from reaching an equilibrium condition, and thereby enables the reaction to go to completion. The repeated vaporization, condensation and refluxing of carbon disulfid serves, then, as an efficient means of disturbing the equilibrium of the reacting mass by the constant removal of one of the products.

Although any desired quantities of materials may be used, we have found that for every 100 pounds of thio-carbanilide desired, approximately 83.5 pounds of aniline and 50 pounds of carbon disulfid should preferably be used. In every case, it is essential to use a moderate excess of carbon disulfid (as compared with previous methods of manufacturing of these materials) in order to react completely with the amine taken, and to furnish vapors to serve as a means of removing hydrogen sulfid from the mass.

We have limited our description chiefly to the preparation of thio-carbanilide, but other amines than aniline may also be used to produce any thio-urea desired. Thus in place of aniline, we may use any of the toluidines, xylidenes, or other aromatic primary amines. The sole limitation and the chief feature of our invention is the employment of moderate temperatures in the process, and it is this feature which we intend to cover in the following claims as broadly as is permissible in view of the prior art.

What we claim is:

1. The process of making a thio-urea which comprises reacting a primary aromatic amine and carbon disulfid, maintaining the temperature of the reacting materials at from 46° to 46.2° centigrade, removing the vapors and gaseous by-products from the reaction zone, condensing the said vapors, and returning the condensed vapors to the reacting materials for revaporization to remove a further quantity of gaseous by-products.

2. The process of making thiocarbanilide which process comprises reacting aniline and carbon disulfid, maintaining the temperature of said reacting materials at from 46° to 46.2° centigrade, removing the vapors of carbon bisulfid admixed with hydrogen sulfid from the reaction zone, condensing the said vapors, and returning the condensed carbon disulfid to the reacting materials for revaporization to remove a further quantity of hydrogen sulfid.

3. The process of making thio-carbanilide which comprises reacting aniline and carbon disulfid in the proportion of substantially 83.5 parts of aniline and 50 parts of carbon disulfid, maintaining the temperature of the reacting materials at from 46° to 46.2° centigrade, removing the vapors of carbon disulfid admixed with hydrogen sulfid, condensing the said vapors, and returning the condensed carbon disulfid to the reacting materials for revaporization to remove a further quantity of hydrogen sulfid.

4. In the process of making a thio-urea by the interaction of a primary aromatic amine and carbon disulfid, the step which comprises using the vapors of carbon disulfid substantially at the boiling temperature as a sweeping means for removing gaseous reaction products from the reaction zone, whereby the equilibrium of the reaction is disturbed, and the reaction forced to proceed to completion.

5. In the process of making thio-carbanilide by the interaction of aniline and carbon disulfid, the step which comprises using the vapors of carbon disulfid substantially at the boiling temperature as a sweeping means for removing the hydrogen sulfid produced in the reaction, whereby the equilibrium of the reacting mass is disturbed, and the change forced to proceed to completion.

CARL N. HAND.
CLARENCE E. SMITH.